July 18, 1933.  H. COUBROUGH  1,918,452
RESILIENT VEHICLE SUSPENSION
Filed June 24, 1930
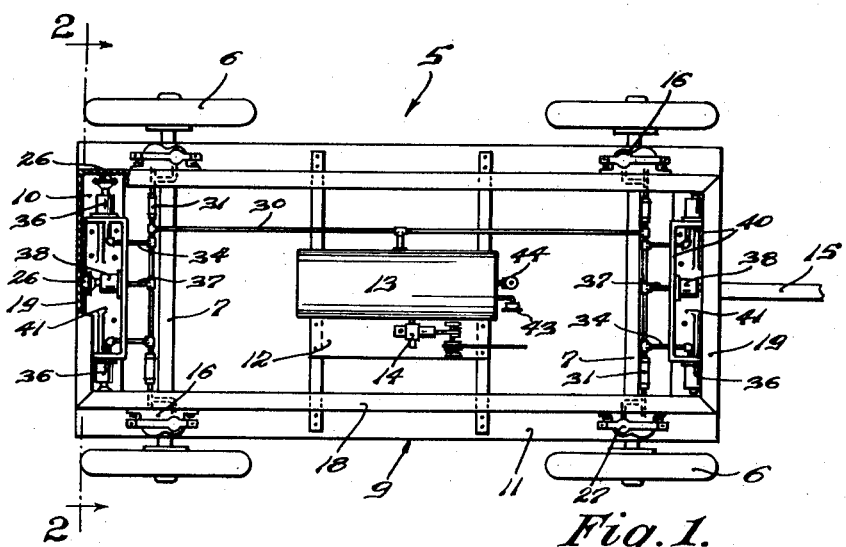
Fig.1.
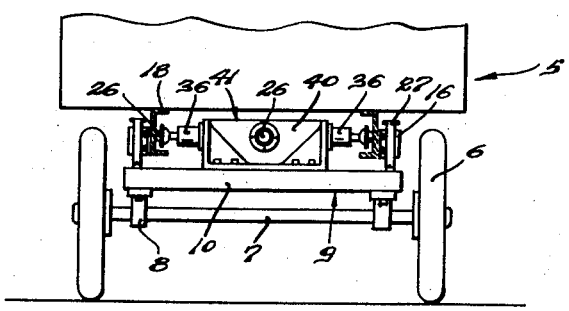
Fig.2.
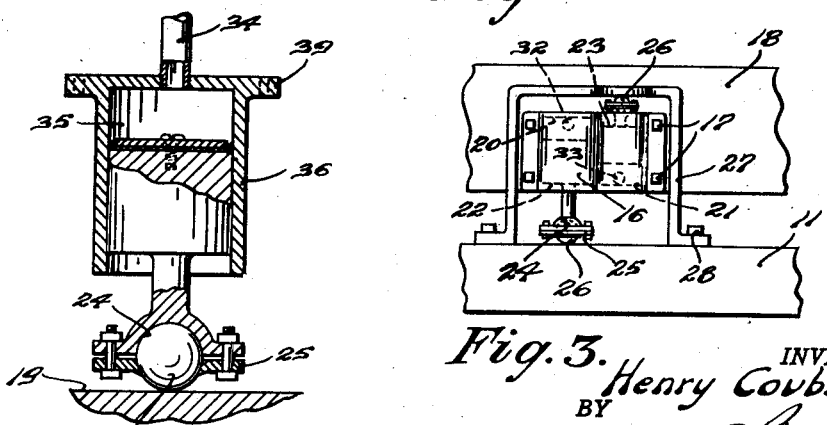
Fig.3.
Fig.4.
INVENTOR
Henry Coubrough
BY
ATTORNEY Patented July 18, 1933

1,918,452

UNITED STATES PATENT OFFICE

HENRY COUBROUGH, OF SEATTLE, WASHINGTON

RESILIENT VEHICLE SUSPENSION

Application filed June 24, 1930. Serial No. 463,406.

This invention relates to resilient vehicle suspension, and more particularly to apparatus therefor and the novel manner of utilizing the same.

The object, generally stated, is the provision of means most effective in the provision of strong, durable and efficient devices for resiliently coupling the undercarriage or running gear to a body frame.

A more particular object resides in the provision of devices so arranged in opposition, one with respect to another, as to attain a most advantageous equalization of the lateral, end and vertical thrusts co-incident to the motivation of a vehicle.

A further and particular object lies in the provision of a vehicle suspension adaptable to adjustability in accommodating various loads. A still further object is the provision in devices of this character, of means for eliminating torsion in the provision of a full-floating suspension.

The foregoing, with further objects and advantages, will appear in the course of the following detailed description and throughout the claims annexed thereto, the invention consisting in the novel construction, adaptation and the combination of cooperative parts hereinafter described and claimed.

In the drawing,—

Figure 1 is a top plan view of the undercarriage and body frame construction of a vehicle embodying the present invention. Fig. 2 is a transverse vertical section thereof, taken substantially on line 2—2 of Fig. 1. Fig. 3 is a side elevation, taken in detail to an enlarged scale, illustrating vertical suspension blocks shown in the foregoing views; and Fig. 4 is a transverse vertical section illustrating the preferred piston installation thereof, parts being indicated in side elevation.

Reference being had thereto, and wherein the exemplification of the invention for ease of description, is had to a truck trailer, represented generally by the numeral 5, 6 indicates vehicle wheels rotatably mounted upon horizontal axle spindles, said axles journaled in a conventional manner through the bracket hangers 8 of an undercarriage generally designated as 9.

Said carriage, comprising transverse and longitudinal channel bars 10, 11, respectively, provides a transverse platform 12 medially of its length for rigidly supporting a pressure tank 13.

The compressor unit 14 therefor, utilizing a conventional piston, may be arranged in an integral assembly, or if desired, coupled through the instrumentality of a resilient hose from a suitable disposition on a forward motive medium, such as a truck. 15 indicates a source of power, such as a draw-bar.

In an allocated disposition preferably in the vertical plane of the wheel spindles, I provide casing blocks 16 secured as by bolts 17 laterally of side bars 18, said side bars constituting, with transverse bar members 19, a vehicle body frame. Said blocks are characterized by the provision therein of a pair of cylinders 20, 21, adapted to receive pistons 22, 23. Said pistons, as with further pistons hereinafter described, are provided with integrally arranged connecting rod shanks conformed at respective outer extremities, to provide sockets 24 cooperative with apertured retention rings 25 in the securement of respective ball riders 26.

More particularly, said piston 22 is conformed to a larger diameter than piston 23, accommodating load weight by the contactual engagement of the ball rider to carriage bar 11, a U-shaped configuration of brackets 27 being secured, as by bolts 28, to said bar for contactual engagement with an oppositional ball rider in the provision of a rebound counteraction to the aforesaid piston 22.

A supply line 30, communicating, through resilient hose connections 31 to the inlet ports 32, 33 of said cylinders, admits compressed air from tank 13. Said line is further adapted to supply compressed air, through branch lines 34 to the chambers 35 of laterally directed cylinders 36, branch lines 37 admitting air to the chambers of cylinders 38 arranged in a longitudinal plane medially of the chassis.

More particularly, flanged heads 39 of said cylinders 36, 38 are securely bolted to plate sides 40 of carriage supported bracket members 41, ball riders carried by respective piston connecting rods engaging the inner surface of the longitudinal and transverse bars 18, 19 of the aforesaid body frame.

In operation, tank pressure through supply lines to the respective cylinder chambers, governed by a tank gauge and valve 43, 44, affords a vehicle support against road strains imparted to the body frame in opposition to the under-carriage structure. The resiliency of the body may be readily adjusted as desired in effecting an efficient medium of support, the pressure being governed, preferably, as an accommodation to the trailer load.

Lateral and end thrust, as is believed evident, are taken up by the air pressure exerted to the oppositional pistons of both cylinder sets 36 and 38. Vertical thrusts are equalized in the cylinder chambers 20, 21.

While the invention is exemplified in a trailer construction, it is believed evident that the same might be embodied unitarily or conjointly with spring suspension for such other vehicles as might be desired. Accordingly, I do not wish to be taken as confining myself particularly to the structural form illustrated, except as confined by the scope of the claims hereto annexed.

What I claim, is,—

1. In a vehicle comprising running gear and an undercarriage for said running gear, a body, and a frame for said body, of means for resiliently suspending said body frame with respect to said undercarriage, said means including a plurality of cylinders secured to said undercarriage and frame in vertical and horizontal planes, pistons for said cylinders, pressure means affording a thrust contact of said horizontally disposed pistons against said undercarriage, one piston in opposition to another, and means affording a pressure thrust of said vertically disposed pistons against said body frame, one piston in opposition to another.

2. In a vehicle, the combination with the vehicle wheels, axles therefor, an undercarriage rigid with respect to said axles and supported thereon, a body, and a frame for said body, of cushion devices introduced between said undercarriage and the body frame for yieldably supporting the latter, said means comprising a plurality of cylinder blocks secured to said body frame and each providing a pair of upright companion cylinders, one of said companion cylinders having its upper and the other having its lower end closed, pistons received in said cylinders, means to supply compressed air to the closed end portion of a respective cylinder for forcing the respective piston outwardly of said closed end, and means carried by the outer thrust portions of each piston and engaging the undercarriage for imparting the thrust of such pistons upon said undercarriage.

3. The structure as defined in claim 2, said cylinders communicating with a common source of supply, and wherein the cylinders imparting a downward thrust upon said undercarriage are of greater diameter, than the cylinders imparting the upward thrust.

4. The combination with the undercarriage and the body frame of a vehicle, of cushion means for supporting said frame, said means comprising a primary set of cylinders, pistons therefor, a pressure supply to said cylinders for forcing the respective pistons downwardly, a secondary set of cylinders, pistons therefor, and a pressure supply to said last named cylinders for forcing the respective pistons upwardly, and means secured to the undercarriage and engageable by the pistons of each of said sets of cylinders, said first named set of cylinders having a greater thrust capacity than the secondary set of cylinders.

HENRY COUBROUGH.